United States Patent [19]

Tsuchida

[11] Patent Number: 5,857,107
[45] Date of Patent: Jan. 5, 1999

[54] DISTRIBUTED SOFTWARE DEVELOPMENT MANAGEMENT SYSTEM HAVING SUBSYSTEM INFORMATION FILE FOR STORING INFORMATION INDICATING A CORRESPONDENCE BETWEEN SUBSYSTEMS AND SPECIFICATIONS

[75] Inventor: Hiroyuki Tsuchida, Tokyo, Japan

[73] Assignee: NEC Corporation, Tokyo, Japan

[21] Appl. No.: 527,427

[22] Filed: Sep. 13, 1995

[30] Foreign Application Priority Data

Sep. 16, 1994 [JP] Japan ................................ 6-221294

[51] Int. Cl.[6] ....................................................... G06F 9/00
[52] U.S. Cl. ........................... 395/712; 395/680; 395/670
[58] Field of Search .............................. 395/712, 183.14, 395/670, 680, 672

[56] References Cited

U.S. PATENT DOCUMENTS 5,421,012  5/1995  Khoyi et al. ............................ 395/677

FOREIGN PATENT DOCUMENTS 63-273132  11/1988  Japan .

*Primary Examiner*—Majid A. Banankhan
*Attorney, Agent, or Firm*—Whitham, Curtis & Whtitham

[57] ABSTRACT

A distributed software development system includes an apparatus for managing subsystem development in at least one development device. The management apparatus includes a system information file for storing information indicative of a correspondence between a plurality of subsystems and a plurality of specifications. The contents of the specifications are stored in a specification information file. When a subsystem is revised, a subsystem extracting device extracts from these files information regarding the subsystem to be revised. The extracted information is sent to the development device. After being revised by the development device, the extracted information is sent back to the management apparatus. An updating device receives the information and updates the subsystem information file and the specification information file according to the information received.

24 Claims, 18 Drawing Sheets

| SYSTEM NAME AREA 111 | SYSTEM VERSION AREA 112 | SUBSYSTEM NAME AREA 113 | SUBSYSTEM VERSION AREA 114 |
|---|---|---|---|
| | | | |
| | | | |

FIG.2

| SUBSYSTEM NAME AREA 211 | SUBSYSTEM VERSION AREA 212 | SPECIFICATION NAME AREA 213 | SPECIFICATION VERSION AREA 214 |
|---|---|---|---|
| | | | |
| | | | |

FIG.3

| SPECIFICATION NAME AREA 311 | SPECIFICATION VERSION AREA 312 | SPECIFICATION CONTENTS AREA 313 |
|---|---|---|
| | | |
| | | |

FIG.4

| NAME OF PROGRAM: EXM60 | REV: 0.68 | DEFINITION OF ACTIONS |
|---|---|---|

| JOIN SEARCH | | |
|---|---|---|
| IN | NAME OF INPUT FILE | TOUR MASTER FILE |
| | NAME OF INPUT DESCRIPTION | |
| UPDATE | NAME OF OUTPUT DESCRIPTION | |
| FILE | NAME OF MASTER FILE | DEPARTURE FILE |
| | SEARCH DESCRIPTION | KEY M-TOUR CODE DUP |
| AT INIT | INVOKED PROCEDURE | |
| | DESCRIPTION OF OPERATION | |
| AT SEARCH | INVOKED PROCEDURE | |
| | DESCRIPTION OF OPERATION | |
| AT MAIN | INVOKED PROCEDURE | |
| | DESCRIPTION OF OPERATION | |
| WHEN | CONDITION | %SEARCH(DEPATURE FILE) = 2 |
| OUT | NAME OF OUTPUT FILE | WORK FILE |
| | NAME OF OUTPUT DESCRIPTION | WORK FILE OUTPUT |

| REPORT | | |
|---|---|---|
| IN | NAME OF INPUT FILE | WORK FILE |
| OUT | NAME OF OUTPUT FILE | REPORT FILE |
| | NAME OF OUTPUT FORMAT | LIST |

FIG.6

| TITLE:PROGRAM SPEC. TOUR LIST OUTPUT PROGRAM | DATE | VER. | REGISTRATION NUMBER |
|---|---|---|---|
| | 92.10.30 | 0.68 | AUTHOR |
| NAME OF PROGRAM EXM60 | REV: 068 | NAME OF OUTPUT FILE: OUTPUT OF WORK FILE | NAME OF FILE: WORK FILE |
| INITIAL PROCESSING | | | |
| NAME OF RECORD | WORK FILE | | |
| PROCEDURE | | | |
| CONDITION | | | |

| NO. | NAME OF ITEMS | OUTPUT PROCESSING |
|---|---|---|
| 0001 | W-TOUR CODE | M-TOUR CODE |
| 0002 | W-TOUR NAME | M-TOUR NAME |
| 0003 | W-OPTION NAME 1 | M-OPTION NAME 1 |
| 0004 | W-OPTION NAME 2 | M-OPTION NAME 2 |
| 0005 | W-OPTION NAME 3 | M-OPTION NAME 3 |
| 0006 | W-OPTION NAME 4 | M-OPTION NAME 4 |
| 0007 | W-OPTION NAME 5 | M-OPTION NAME 5 |
| 0008 | W-DEPARTURE DATE | F-DEPARTURE DATE |
| 0009 | W-OP 1 PERSON | F-OP 1 PERSON |
| 0010 | W-OP 2 PERSON | F-OP 2 PERSON |
| 0011 | W-OP 3 PERSON | F-OP 3 PERSON |
| 0012 | W-OP 4 PERSON | F-OP 4 PERSON |
| 0013 | W-OP 5 PERSON | F-OP 5 PERSON |
| TERMINATE PROCESSING | | |

FIG.7

| NAME OF PROGRAM: EXM60 | REV: 0.68 | DATA TYPE: PROGRAMM INFORMATION | NAME OF FILE: REPORT FILE |
|---|---|---|---|

```
000001      TFILE      REPORT FILE
000002          DEV LIST
000003          APPLY SHIFT-CODE PPR-1
000004    .
```

| NAME OF PROGRAM: EXM60 | REV: 0.68 | DATA TYPE: PROGRAMM INFORMATION | NAME OF FILE: WORK FILE |
|---|---|---|---|

```
000001      TFILE      WORK FILE WORK
000002
000003    01    WORK RECORD.
000004      02    W-TOUR CODE         PIC X(6)
000005      02    W-TOUR NAME         PIC N(20)
000006      02    W-OPTION NAME 1     PIC N(10)
000007      02    W-OPTION NAME 2     PIC N(10)
000008      02    W-OPTION NAME 3     PIC N(10)
000009      02    W-OPTION NAME 4     PIC N(10)
000010      02    W-OPTION NAME 5     PIC N(10)
000011      02    W-DEPARTURE DATE    PIC 9(4).
000012      02    W-OP 1 PERSON       PIC 9(3)
000013      02    W-OP 2 PERSON       PIC 9(3)
000014      02    W-OP 3 PERSON       PIC 9(3).
000015      02    W-OP 4 PERSON       PIC 9(3).
000016      02    W-OP 5 PERSON       PIC 9(3).
```

| NAME OF PROGRAM: EXM60 | REV: 0.68 | DATA TYPE: PROGRAMM INFORMATION | NAME OF FILE: TOUR MASTER |
|---|---|---|---|

```
000001      TFILE      TOUR MASTER
000002          DEV       M1TOUR(RDB)
000003          KEY       ·M-TOUR CODE
000004          ACCESS DYNAMIC
000005          ORG       INDEXED
000006
000007    COPY MTOURC.
```

| NAME OF PROGRAM: EXM60 | REV: 0.68 | DATA TYPE: PROGRAMM INFORMATION | NAME OF FILE: DEPARTURE FILE |
|---|---|---|---|
| 000001 | TFILE | | |
| 000002 | DEV | FDEPT(RDB) | |
| 000003 | KEY | F-TOUR CODE | |
| 000004 | ACCESS DYNAMIC | | |
| 000005 | OPENMODE | INPUT | |
| 000006 | ORG | INDEXED | |
| 000007 | | | |
| 000008 | COPY FIDEPTC. | | |

FIG.8B

* INQUIRY OF THE NUMBER OF THE STOCK *

PRODUCT NAME     CCCCCCCCCCCCCCCCCCCCCCCC

PRODUCT CODE     NNNNNNNNNNNNNN

STOCK NUMBER     NNNN

①  INPUT PRODUCT NAME AND PRODUCT CODE
③  PUSH ENTER KEY

FIG.9

| SYSTEM NAME | SYSTEM VERSION | SUBSYSTEM NAME | SUBSYSTEM VERSION |
|---|---|---|---|
| DELIVERY SYSTEM SERVICE | 2.2 | | |
| | | CARGO COLLECTION | 1.1 |
| | | DELIVERY | 1.3 |
| | | CHARGE | 2.1 |

FIG.12

| SYSTEM NAME | SYSTEM VERSION | SUBSYSTEM NAME | SPECIFICATION VERSION |
|---|---|---|---|
| CARGO COLLECTION | 1.1 | | |
| | | CAR ALLOCATION | 1.7 |
| | | PERSONNEL MANAGEMENT | 1.2 |
| | | CARGO COLLECTION | 1.5 |
| DELIVERY | 1.3 | | |
| | | CAR ALLOCATION | 1.7 |
| | | PERSONNEL MANAGEMENT | 1.3 |
| | | DELIVERY SUPERVISING | 1.5 |
| CHARGE | 2.1 | | |
| | | CARGO COLLECTION CHARGE | 1.5 |
| | | DELIVERY CHARGE | 2.1 |

FIG.13

| SPECIFICATION NAME | VERSION | CONTENTS OF SPECIFICATION |
|---|---|---|
| CAR ALLOCATION | | |
| | 1.1 | ... |
| | ≀ | ≀ |
| | 1.7 | ... |
| PERSONNEL MANAGEMENT | | |
| | 1.1 | ... |
| | ≀ | ≀ |
| | 1.2 | ... |
| CARGO COLLECTION | | |
| | 1.1 | ... |
| | ≀ | ≀ |
| | 1.5 | ... |
| DELIVERY SUPERVISING | | |
| | 1.1 | ... |
| | ≀ | ≀ |
| | 1.8 | ... |
| CARGO COLLECTION CHARGE | 1.1 | ... |
| | ≀ | ≀ |
| | 1.5 | ... |
| DELIVERY CHARGE | | |
| | 1.1 | ... |
| | ≀ | ≀ |
| | 2.1 | ... |

FIG.14

SUBSYTEM INFORMATION: FILE 50

| SUBSYSTEM NAME | VERSION | SPECIFICATION NAME | VERSION |
|---|---|---|---|
| CARGO COLLECTION | 1.1 | | |
| | | CAR ALLOCATION | 1.7 |
| | | PERSONNEL MANAGEMENT | 1.2 |
| | | CARGO COLLECTION | 1.5 |
| DELIVERY | 1.3 | | |
| | | CAR ALLOCATION | 1.7 |
| | | PERSONNEL MANAGEMENT | 1.3 |

↓ KEEP ON AREA FOR "CARGO COLLECTION R1.2"

| SUBSYSTEM NAME | VERSION | SPECIFICATION NAME | VERSION |
|---|---|---|---|
| CARGO COLLECTION | 1.1 | | |
| | | CAR ALLOCATION | 1.7 |
| | | PERSONNEL MANAGEMENT | 1.2 |
| | | CARGO COLLECTION | 1.5 |
| CARGO COLLECTION | 1.2 | | |
| | | CAR ALLOCATION | 1.7 |
| | | PERSONNEL MANAGEMENT | 1.2 |
| | | CARGO COLLECTION | 1.5 |
| DELIVERY | 1.3 | | |
| | | CAR ALLOCATION | 1.7 |
| | | PERSONNEL MANAGEMENT | 1.3 |

SUBSYSTEM CONFIGURATION DATA 100

| SUBSYSTEM NAME | VERSION | SPECIFICATION NAME | VERSION |
|---|---|---|---|
| CARGO COLLECTION | 1.1 | | |
| | | CAR ALLOCATION | 1.7 |
| | | PERSONNEL MANAGEMENT | 1.2 |
| | | CARGO COLLECTION | 1.5 |
| CARGO COLLECTION | 1.2 | | |
| | | CAR ALLOCATION | 1.7 |
| | | PERSONNEL MANAGEMENT | 1.2 |
| | | CARGO COLLECTION | 1.5 |
| DELIVERY | 1.3 | | |
| | | CAR ALLOCATION | 1.7 |
| | | PERSONNEL MANAGEMENT | 1.3 |

FIG.17B

| SUBSYSTEM NAME | VERSION | SPECIFICATION NAME | VERSION |
|---|---|---|---|
| CARGO COLLECTION | 1.1 | | |
| | | CAR ALLOCATION | 1.7 |
| | | PERSONNEL MANAGEMENT | 1.2 |
| | | CARGO COLLECTION | 1.5 |
| CARGO COLLECTION | 1.2 | | |
| | | CAR ALLOCATION | 1.7 |
| | | PERSONNEL MANAGEMENT | 1.2 |
| | | CARGO COLLECTION | 1.6 |
| DELIVERY | 1.3 | | |
| | | CAR ALLOCATION | 1.7 |
| | | PERSONNEL MANAGEMENT | 1.3 |

| SYSTEM NAME | VERSION | SUBSYSTEM NAME | VERSION |
|---|---|---|---|
| DELIVERY SERVICE SYSTEM | 2.1 | | |
| | | CARGO COLLECTION | 1.1 |
| | | DELIVERY | 1.3 |
| | | CHARGE | 2.1 |
| DELIVERY SERVICE SYSTEM | 2.2 | | |
| | | CARGO COLLECTION | 1.2 |
| | | DELIVERY | 1.3 |
| | | CHARGE | 2.1 |

10%

|  | SUBSYSTEM NAME | VERSION | SUBSYSTEM NAME | VERSION |
|---|---|---|---|---|
| COMPARISON OBJECT | CARGO COLLECTION | 1.1 | CARGO COLLECTION | 1.2 |
| COMPARISON RESULT | SPECIFICATION NAME | VERSION | SPECIFICATION NAME | VERSION |
| "MODIFIED" | CARGO COLLECTION | 1.5 | CARGO COLLECTION | 1.6 |

FIG.19A

|  | SPECIFICATION NAME | VERSION | SPECIFICATION NAME | VERSION |
|---|---|---|---|---|
| COMPARISON OBJECT | CARGO COLLECTION | 1.5 | CARGO COLLECTION | 1.6 |
| COMPARISON RESULT | CONTENTS OF SPECIFICATION | | CONTENTS OF SPECIFICATION | |
| "MODIFIED" | COLLECTION AREA: KANTO DISTRICT | | COLLECTION AREA: THE WHOLE COUNTRY | |

FIG.19B

DISTRIBUTED SOFTWARE DEVELOPMENT MANAGEMENT SYSTEM HAVING SUBSYSTEM INFORMATION FILE FOR STORING INFORMATION INDICATING A CORRESPONDENCE BETWEEN SUBSYSTEMS AND SPECIFICATIONS

BACKGROUND OF THE INVENTION

The present invention relates to an apparatus for managing distributed software development, and more particularly to an apparatus for managing a plurality of versions of a software system.

In distributed software development, a software system is divided into subsystems and the subsystems are developed separately.

The function of each subsystem is stated in a document called a program specification (hereinafter referred to as a "specification"). The specification is described in a format that is easy to understand such as a tabular format. Programmers produce source programs in accordance with the specifications. The source programs are compiled and linked together to produce an object program.

The specifications are saved after the system is released and referred to for debugging or upgrading of the system.

Typically, software manufacturers revise a software system frequently and produce many versions of the systems. Many versions of the specification are also produced to describe the function of the corresponding version of the system.

When the difference between first and second versions of a system is examined, the specification of the first version is compared with that of the second version. Therefore, it is essential to keep records of the correspondence between a specific version of the system and the specifications describing this system.

However, in a distributed development system, it is difficult to keep such a record because the subsystems are revised often separately at different times by different programmers.

SUMMARY OF THE INVENTION

In view of the aforementioned problem of the conventional distributed software development system, one object of the present invention is to keep a record of the correspondence between a software system and the specifications describing the software system.

Another object of the present invention is to easily examine the difference between two versions of a software system.

According to the present invention, an apparatus manages development of a software system including a plurality of subsystems. The subsystems are developed in at least one development device.

The apparatus includes a system information file, a specification information file, subsystem extraction means, and updating means.

The subsystem information file stores information indicative of a correspondence between each of the plurality of subsystems and a plurality of specifications related to the plurality of subsystems.

The specification information file stores contents of the plurality of specifications.

The subsystem extracting means is activated when one of the subsystems is revised. The subsystem extracting means extracts first information regarding the subsystem to be revised from the subsystem information file and the specification information file. Thereafter, the subsystem extracting means sends the first information to the development device. The development device produces second information by revising the first information.

The updating means receives the second information from the development device and updates the subsystem information file and the specification information file according to the second information.

The apparatus may includes difference output means. The difference output means examines a difference between two subsystems.

The apparatus may send first and second information to different development devices. The first and second information are revised separately.

BRIEF DESCRIPTION OF THE DRAWINGS

Other objects, features and advantages of the present invention will become more apparent when the following description is read in conjunction with the accompanying drawings, wherein:

FIG. 2 shows a file format of a system information file 40 according to the present invention.

FIG. 3 shows a file format of a subsystem information file 50 according to the present invention.

FIG. 4 shows a file format of the specification information file 60.

FIGS. 5 to 9 show examples of the specifications.

FIGS. 12 to 14 shows the contents of the system information file 40, the subsystem information file 50 and the specification information file 60 of the exemplary operation.

FIG. 16 illustrates the operation of a subsystem extract means 80 according to the present invention.

FIGS. 17(*a*) and 17(*b*) illustrates the revision of a subsystem information file 150 performed by revision means 120 according to the present invention.

FIGS. 19(*a*) and 19(*b*) show the image of data output by difference output means 70 according to the present invention.

In these drawings, the same reference numerals depict the same parts, respectively.

DETAILED DESCRIPTION OF THE PREFERRED EMBODIMENTS

Figure 1:
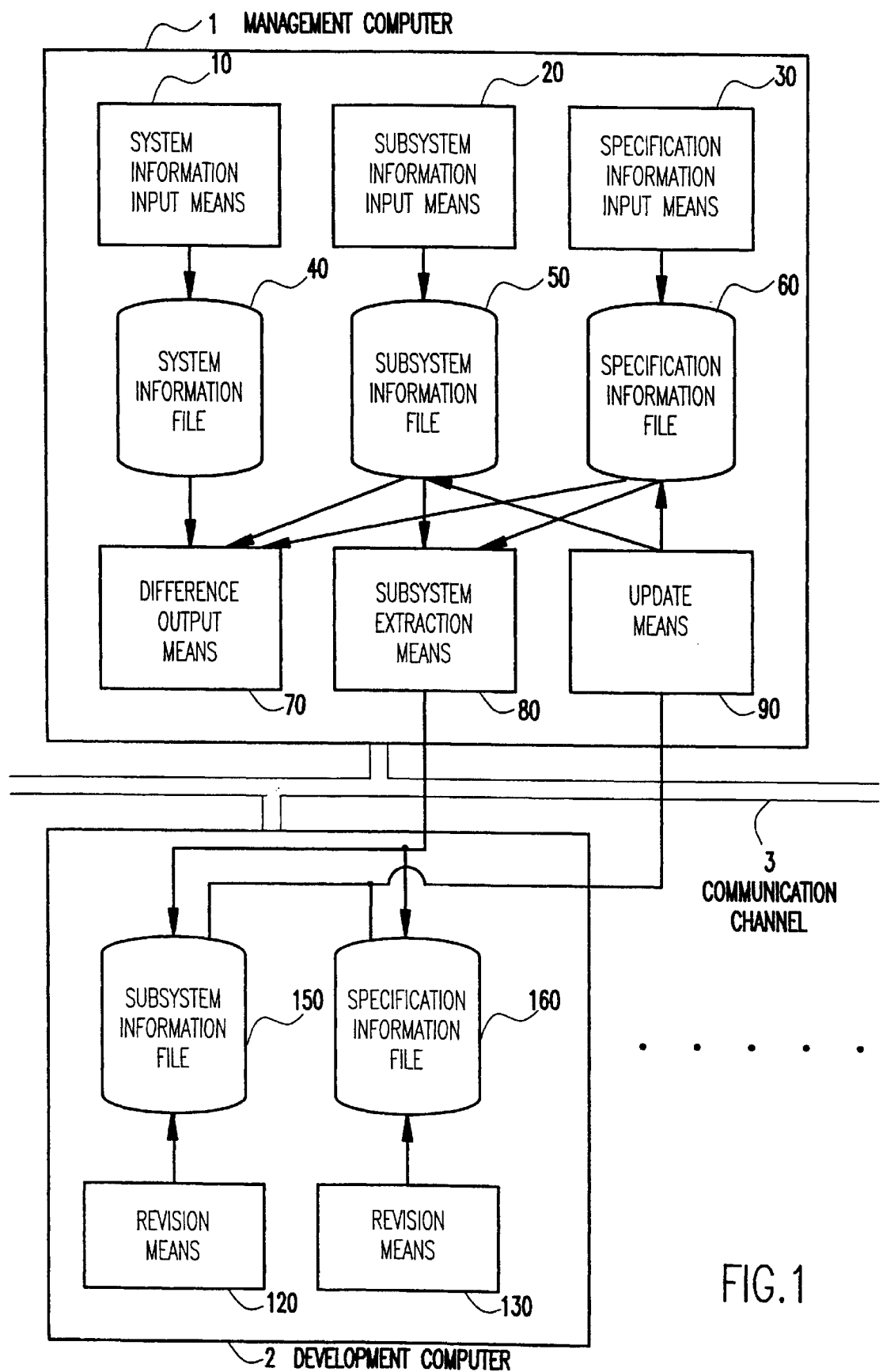
FIG. 1 is a block diagram of the distributed software development system according to the present invention.

Referring to FIG. 1, according to the present invention, a distributed software development system includes a management computer 1, a development computer 2 and a communication channel 3. The management computer 1 sends information to and receives information from the development computer 2 through the communication channel 3 connected therebetween. The development system may include a plurality of the development computers 2.

The management computer 1 includes a system information file 40, a subsystem information file 50 and specification information file 60. The contents of the files 40, 50 and 60 are described below. The contents of the files 40, 50 and 60 are set or updated by system information input means 10, subsystem information input means 20 and specification information input means 30, respectively.

Referring to FIG. 2, the system information file 40 stores system information showing a group of subsystems forming a software system. The system and subsystem are identified by identifiers (e.g., a combination of a system name and a version number). In this exemplary embodiment, the system information file 40 has a system name area 111, a system version area 112, a subsystem name area 113 and a subsystem version area 114.

The system name area 111 and the system version area 112 store the name and the version number of a software system, respectively. The information stored in the areas 111 and 112 identifies one version of a software system.

The subsystem name area 113 and the subsystem version area 114 store the name and the version number of subsystems forming the software system identified by the information in the areas 111 and 112, respectively.

Hereinafter "subsystem configuration data" refers to the combination of a subsystem identifier (i.e., a subsystem name and a version number) and identifiers (i.e., a specification name and a version number) of subsystems forming the identified subsystem.

Referring to FIG. 3, the subsystem information file 50 stores subsystem information showing a group of specifications describing the function of a subsystem. The subsystem information file 50 includes a subsystem name area 211, a subsystem version area 212, a specification name area 213 and a specification version area 214.

The subsystem name area 211 and subsystem version area 212 store the name and the version number of a subsystem. The specification name area 213 and the specification version area 214 store the name and version numbers of the specifications describing the function of the subsystem identified by the information in the areas 211 and 212, respectively.

In this exemplary embodiment, not only the latest version of each subsystem but also all versions of the subsystems are registered in the subsystem information file 50.

Referring to FIG. 4, the specification information file 60 stores specification information including the contents of the specifications. The specification information file 60 includes a specification name area 311, a specification version area 312 and a specification contents area 313.

The specification name area 311 and the specification version area 312 store the name and the version number of the specification, respectively. The specification contents area 313 stores the contents of the specification identified by the information in the areas 311 and 312.

Referring to FIGS. 5 to 9 showing examples of the specification, the contents of the specification are a document which describes the function of a subsystem in a man-readable format (e.g., comprehensible to human operators.) The specification should be distinguished from a source program.

Figure 5:
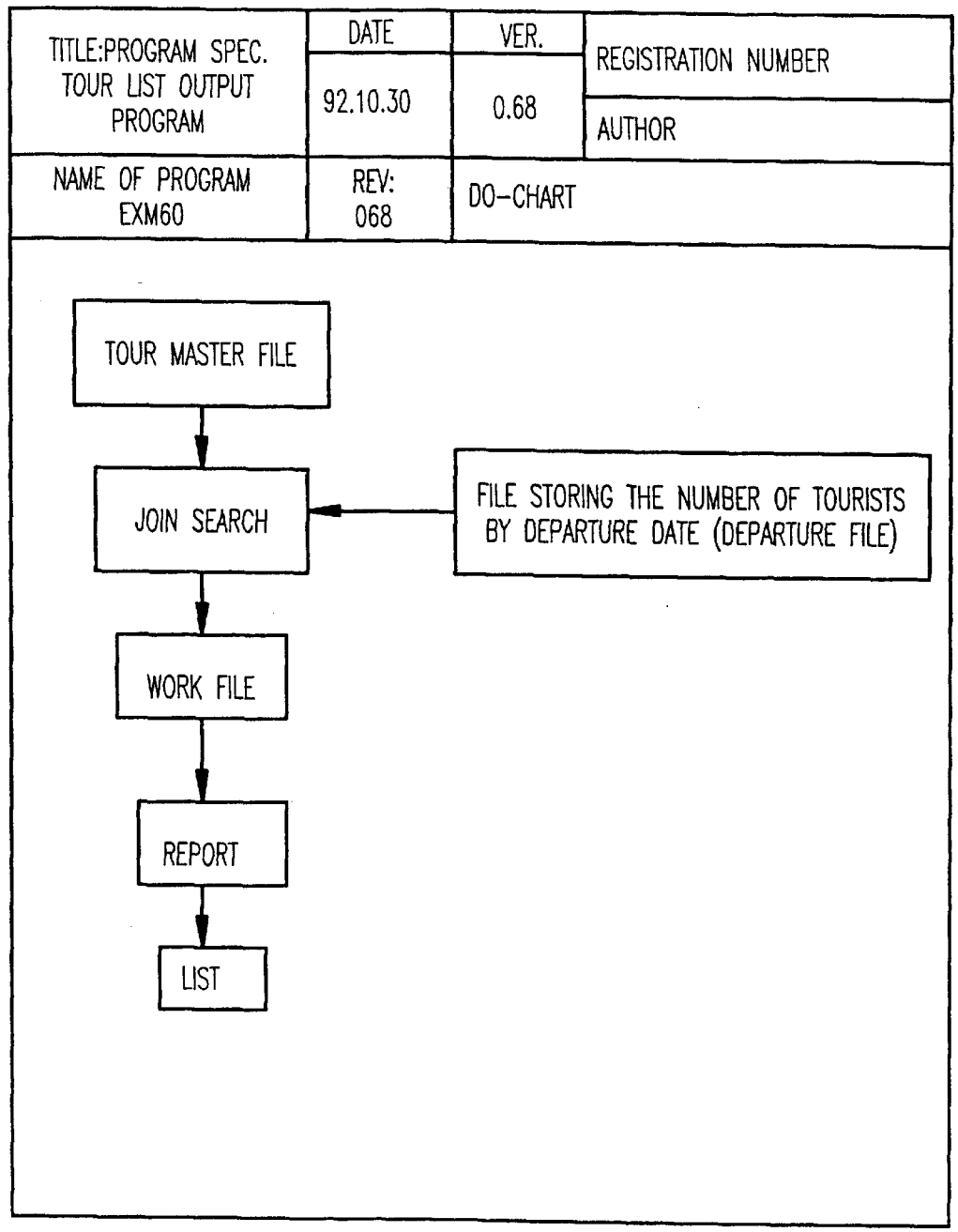

FIG. 5 shows an example of a program specification describing the operation of a program. The program specification may include a data flow diagram.

FIG. 6 shows an example of an action definition specification defining the operation of each action, "action" being a command executed in a system in which a source program is produced from a specification.

FIG. 7 shows another example of the program specification describing the correspondence between items in a file and items in output data.

FIG. 8 shows an example of a file specification describing the format of records in files.

FIG. 9 shows an example of a screen specification describing the format of a displayed image.

Referring again to FIG. 1, the management computer 1 further includes difference output means 70, subsystem extraction means 80 and update means 90.

The subsystem extraction means 80, which is one feature of the present invention, receives an identifier of a subsystem (e.g., a combination of a subsystem name and a version number) and extracts subsystem information regarding the identified subsystem from the subsystem information file 50. The subsystem extraction means 80 also extracts specification information regarding the specifications describing the function of the identified subsystem from the specification information file 60. Thereafter, the subsystem extraction means 80 sends the extracted information to the development computer 2 through the communication channel 3. The subsystem information and the specification information sent to the development computer 2 are revised by the development computer 2.

An exemplary operation of the subsystem extraction means 80 is described below.

The update means 90 receives the specification information and the specification information revised by the development computer 2 through the communication channel 3. Thereafter, the update means 90 updates the contents of the subsystem information file 50 and the specification information file 60 according to the information revised by the development computer 2.

The difference output means 70 examines the difference between subsystems or between specifications and outputs the difference to a device (e.g., a display such as a cathode ray tube (CRT) display, a hard copy printer, or the like).

Next is described the detailed operation of the difference output means 70 when outputting the difference between subsystems.

Figure 10A:
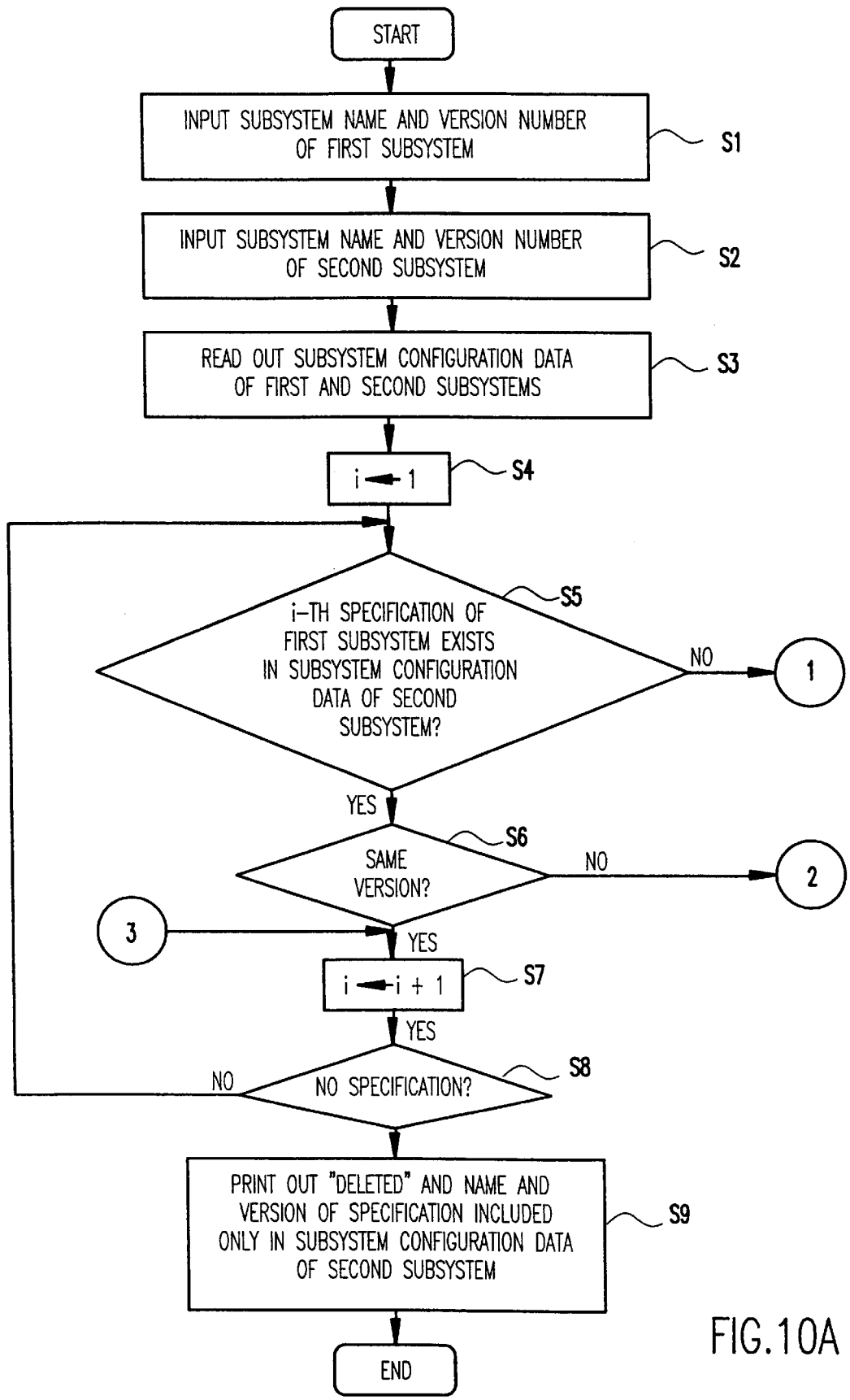
FIGS. 10(*a*) and 10(*b*) illustrate the operation of a difference output means 70 according to the present invention.

Referring to FIG. 10(a), in steps 1 and 2, the difference output means 70 receives (e.g., has input thereto) names and version numbers of the first and second subsystems.

In step 3, the difference output means 70 reads out of the subsystem information file 50 the subsystem configuration data of the first and second subsystems.

In step 4, a variable i is set to 1.

In step 5, the difference output means 70 reads the name and the version number of the i-th specification of the first subsystem out of the subsystem configuration data of the first subsystem. Thereafter, the difference output means 70 determines whether or not the name of the i-th specification of the first subsystem exists in the subsystem configuration data of the second subsystem.

If the name of the i-th specification exists, the difference output means 70 branches to step 6. This means that the i-th specification is included in both the first and second subsystems irrespective of the version number. If the name of the i-th specification does not exist, the difference output means 70 branches to step 10 shown in FIG. 10(b). This means that the i-th specification is included in the first subsystem but not in the second subsystem.

Figure 10B:
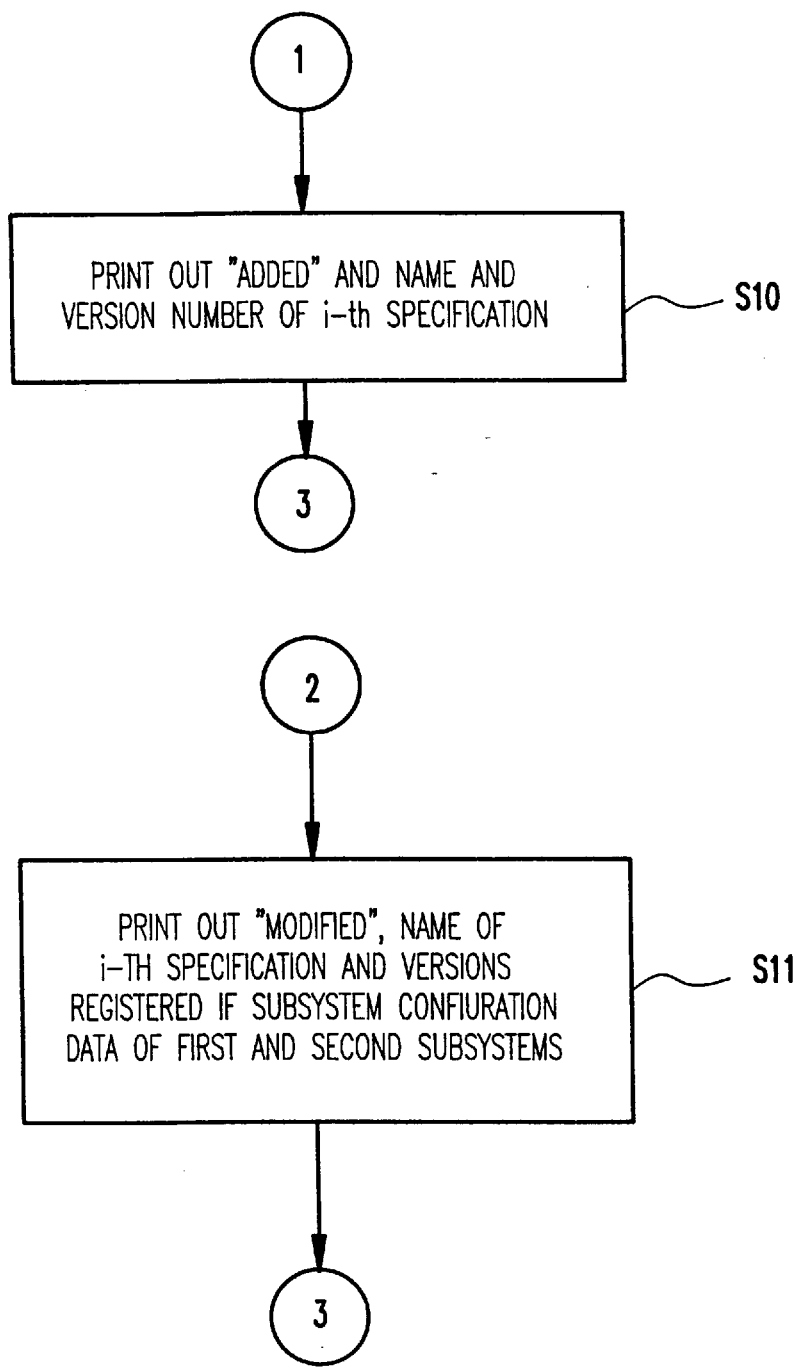

Referring to FIG. 10(b), in step 10, the difference output means 70 prints "Added" and the name and the version number of the i-th specification.

Referring again to FIG. 10(a), in step 6, the difference output means 70 determines whether or not the i-th specification of the second subsystem has the same version number as that of the i-th specification of the first subsystem.

If they have the same version number, the difference output means 70 branches to step 7. Otherwise, the difference output means 70 branches to step 11 shown in FIG. 10(b).

Referring again to FIG. 10(b), in step 11, the difference output means 70 prints "Modified" and the name of the i-th specification. Furthermore, the difference output means 70 prints the version numbers of the i-th specification of the first and second subsystems.

Referring again to FIG. 10(a), in step 7, the variable i is set to i+1.

In step 8, the difference output means 70 determines whether or not the i-th specification exists in the subsystem configuration data of the first subsystem.

If it exists, the difference output means 70 branches to step 5. Otherwise, the difference output means 70 branches to step 9.

In step 9, the difference output means 70 prints "deleted", and the names and the version numbers of the specifications included only in the subsystem configuration data of the second subsystem and not in that of the first subsystem.

Through the aforementioned steps, the difference (i.e., "added", "modified", and "deleted") between subsystems is output.

Referring again to FIG. 1, the development computer 2 includes a subsystem information file 150 and a specification information file 160. The files 150 and 160 store the information sent from the management computer 1 via the communication channel 3.

Specifically, the subsystem information file 150 stores a portion of the information stored in the subsystem information file 50 in the management computer 1. The specification information file 160 stores a portion of the information stored in the specification information file 60 in the management computer 1.

The system information file 150 and the specification information file 160 are revised by revision means 120 and 130, respectively. The revision means 120 and 130 are connected to an input device (e.g., a keyboard, a "mouse", a pointer, a joystick or the like). The operator revises the files 150 and 160 via the input device and the revision means 120 and 130.

Next is described the operation of the development system referring to an exemplary operation.

Figure 11:
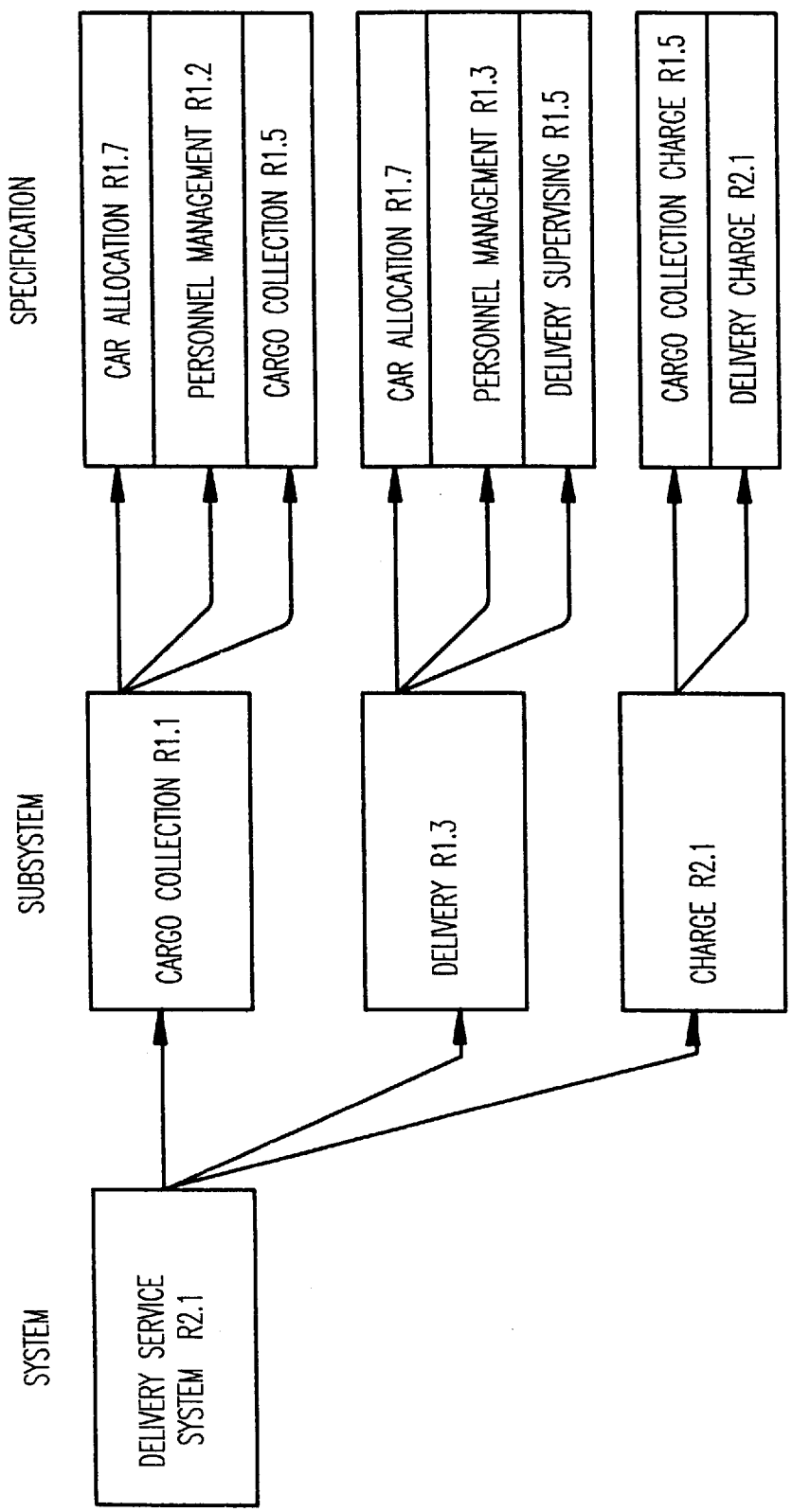
FIG. 11 illustrates the structure of the delivery service system of an exemplary operation.

Referring to FIG. 11, in this exemplary operation, "delivery service system R 2.1" includes "Cargo collection subsystem R 1.1", "Delivery subsystem R 1.3" and "Charge subsystem R 2.1". The numeral following "R" indicates the version number of the system or subsystem.

The function of the "Cargo collection subsystem R 1.1" is described by "Car allocation specification R 1.7", "Personnel management specification R 1.2" and "Cargo collection specification R 1.5".

The function of the "Delivery subsystem R 1.3" is described by "Car Allocation specification R 1.7", "Personnel management specification R 1.3" and "Delivery supervising specification R 1.5".

The function of the "Cargo subsystem R 2.1" is described by "Cargo collection charge specification R 1.5" and "Delivery charge specification R 2.1".

Referring to FIGS. 12 and 13, in the case of this delivery service system, the system information file 40 and the subsystem information file 50 store the information shown in FIGS. 12 and 13, respectively.

Referring to FIG. 14, the specification information file 60 stores the contents of the specifications referred to in the subsystem information file 50.

Figure 15:
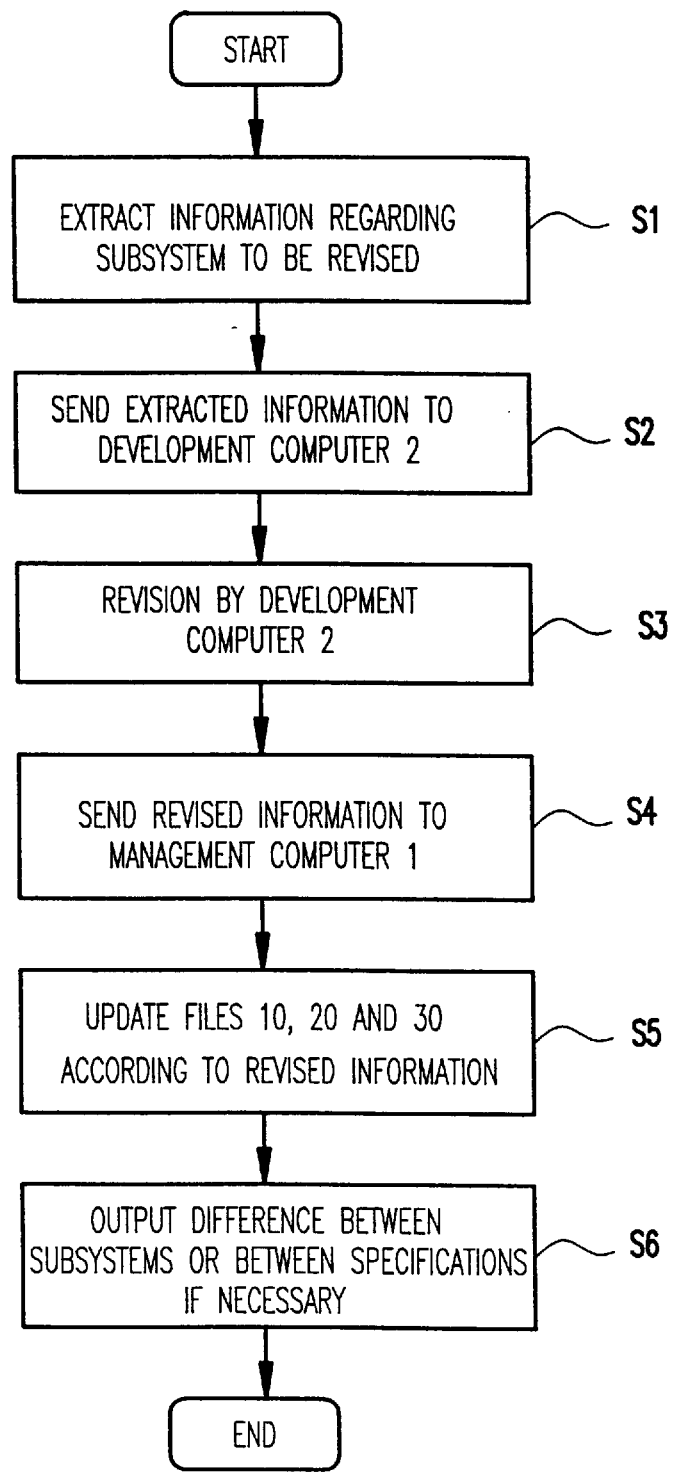
FIG. 15 is a flowchart illustrating the operation of the distributed development system.

Referring to FIG. 15, in step 1, when the need for modification of the software system arises, the subsystem extraction means 80 keeps an area in the subsystem information file 50 for storing information about the revised subsystems. Thereafter, the subsystem extraction means 80 extracts from the subsystem information file 50 the subsystem configuration data of the subsystems to be revised. The subsystem extraction means 80 also extracts from the specification information file 60 the contents of the specifications of the subsystems to be revised.

Referring to FIG. 16, in this exemplary operation, the cargo collection subsystem R 1.1 is revised to produce cargo collection subsystem R 1.2. Therefore, the subsystem extraction means 80 keeps the area in the subsystem information file 50 for cargo collection subsystem R 1.2. The subsystem extraction means 80 extracts subsystem configuration data 100 of the cargo collection subsystem R 1.2.

Referring to FIGS. 14 and 16, the subsystem extraction means 80 extracts the contents of the car allocation specification R 1.7, the personnel management specification R 1.2 and the cargo collection specification R 1.5.

Referring again to FIG. 15, in step 2, the subsystem extraction means 80 sends the extracted information to the development computer 2 through the communication channel 3.

The subsystem configuration data 100 is stored in the subsystem information file 150. The contents of the specifications are stored in the specification information file 160.

In step 3, the operator (e.g., programmer) revises the information sent from the management computer 1 in accordance with the modification of the system. Specifically, when the contents of a specification is modified, the operator increments the version number of the specification in the subsystem configuration data sent from the management computer 1.

Referring to FIGS. 17(a) and 17(b), in this exemplary operation, the cargo collection specification R 1.5 is revised to produce the cargo collection specification R 1.6. The version number of the cargo collection specification in the subsystem configuration data 100 is incremented to 1.6

Referring again to FIG. 15, in step 4, the development computer 2 sends the subsystem configuration data 100 and the contents of the cargo collection specification R 1.6 to the management computer 1 through the communication channel 3.

In step 5, the update means 90 receives this information and updates the subsystem information file 50 and the specification information file 60 according to the information received. Thereafter, the system information file 40 is updated by the operator through the system information input means 10.

Referring to FIG. 17(b), the subsystem configuration data 100 revised by the development computer 2 is registered in the subsystem information file 50. The contents of the cargo collection specification R 1.6 are registered in the specification information file 60.

Figure 18:
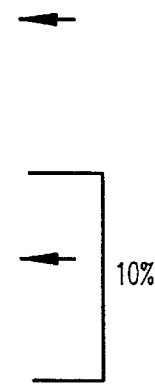
FIG. 18 shows the information stored in the system information file 40 via the system information input means 10 according to the present invention.

Referring to FIG. 18, as a result of the revision of the cargo collection specification, "Delivery service system R 2.2" is produced. The operator registers data about the delivery service system R 2.2 in the system information file 40.

Referring again to FIG. 15, in step 6, when the difference between subsystems or between specifications is examined, the difference output means 70 is activated.

Referring to FIG. 19(a), when the difference between the cargo collection subsystem R 1.1 and the cargo collection subsystem R 1.2 is examined, the difference output means 70 receives the subsystem names and version numbers of the subsystem as "comparison objects".

Thereafter, the difference output means 70 examines the difference between the cargo collection subsystem R 1.1 and the 10 cargo collection subsystem R 1.2 by following the steps shown in FIGS. 10(a) and 10(b).

In this exemplary case, the difference is in the version of the cargo collection specification. That is, as shown in FIG. 17(a), the cargo collection subsystem R 1.1 includes cargo collection specification R 1.5 whereas in FIG. 17(b) the cargo collection subsystem R 1.2 includes the cargo collection subsystem R 1.6. Therefore, the difference output means 70 displays "Modified", "Cargo Collection 1.5" and "Cargo Collection 1.6", for indicating the difference in version numbers.

Referring to FIG. 19(b), when the difference on the level of the specification is examined, the operator inputs the specification names and version numbers of the specification to be examined. The difference output means 70 examines and outputs the difference between the specified specifications.

In this exemplary operation, the difference between the cargo collection specifications R 1.5 and R 1.6 is examined. The difference is in the collection area. That is, the collection area of the cargo collection specification R 1.5 is the "Kanto", area whereas that of the cargo collection specification R 1.6 is the whole country. Therefore, the difference output means 70 displays this difference.

Next is described a modification of the present invention.

Step 6 in FIG. 15 may be executed after step 4 in the same figure. In this case, examining the output of the difference output means 70, the operator interactively determines whether or not the revision made a significant change to a system. If the system is revised significantly (e.g., as determined by the amount of specification changes, by the changed scope of any single specification parameter, and/or by the changed version numbers, rising above a predetermined level or threshold set by the operator or designer's requirements and constraints) and the system information file 40 needs to be updated, the operator updates the system information file 40 through the system information input means 10.

Only one subsystem is revised in the aforementioned exemplary operation. However, more than one subsystem (e.g., the cargo collection subsystem and the delivery subsystem) may be revised simultaneously.

In this case, the subsystem extraction means may extract information of each of the subsystems to be revised and thereafter send the information to different development computers 2. The subsystems are simultaneously revised in different development computers 2. After the revision, the development computers 2 separately send the revised information to the management computer 1. The management computer 1 receives the information and updates the subsystem information file 50 and the specification information file 60 according to the information sent.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. An apparatus for managing development of a software system including a plurality of subsystems, said subsystems being developed with a development device, said apparatus comprising:

a subsystem information file for storing information indicating a correspondence between each of said plurality of subsystems and at least one of a plurality of specifications related to said plurality of subsystems;

a specification information file for storing contents of said plurality of specifications;

a subsystem extractor, activated when at least one of said subsystems is revised, for extracting first information regarding the subsystem to be revised from said subsystem information file and said specification information file, and for sending said first information to said development device; and an updating unit which receives second information which said development device has produced by revising said first information, and updating said subsystem information file and said specification information file with said second information.

2. An apparatus according to claim 1, wherein said first information includes information indicative of part of said specifications describing a function of the subsystem to be revised.

3. An apparatus according to claim 1, wherein said first information includes contents of part of said plurality of specifications describing a function of the subsystem to be revised.

4. An apparatus according to claim 1, wherein said subsystem information file stores subsystem identifiers of said subsystems and specification identifiers of part of said specification describing a function of each of said subsystems.

5. An apparatus according to claim 4, wherein a subsystem identifier of said subsystem identifiers includes a subsystem name and a version number, and a specification identifier of said specification identifiers includes a specification name and a version number.

6. An apparatus according to claim 1, further comprising a difference output unit for examining a difference between two of said plurality of subsystems.

7. An apparatus according to claim 6, wherein said difference output unit includes a unit for examining a difference in two of said plurality of specifications.

8. An apparatus according to claim 1, wherein said apparatus is for use with first and second development devices, wherein said subsystem extractor extracts third and fourth information regarding first and second subsystems, respectively, of said plurality of subsystems;

said subsystem extractor sending said third and fourth information to said first and second development devices, respectively;

said first and second development devices producing fifth and sixth information by revising said third and fourth information, respectively; and said updating unit updating said subsystem information file and said specification information file according to said fifth and sixth information.

9. An apparatus for developing a software system including a plurality of subsystems, comprising:
   a development device; and
   at least one management apparatus,
   wherein said management apparatus comprises:
   a subsystem information for storing information indicating a correspondence between each of said plurality of subsystems and at least one of a plurality of specifications;
   a specification information file for storing contents of said plurality of specifications;
   a subsystem extractor, activated when at least one of said subsystems is revised, for extracting first information regarding the subsystem to be revised from said subsystem information file and said specification information file, and for sending said first information to said development device, said development device producing second information by revising said first information; and
   an updating unit for receiving said second information from said development device and updating said subsystem information file and said specification information file according to said second information.

10. An apparatus according to claim 9, wherein said first information includes information indicative of part of said specifications describing a function of the subsystem to be revised.

11. An apparatus according to claim 9, wherein said first information includes contents of part of said plurality of specifications describing a function of the subsystem to be revised.

12. An apparatus according to claim 9, wherein said subsystem information file stores subsystem identifiers of said subsystems and specification identifiers of part of said specifications describing a function of each of said subsystems.

13. An apparatus according to claim 12, wherein a subsystem identifier of said subsystem identifiers includes a subsystem name and a version number, and a specification identifier of said specification identifiers includes a specification name and a version number.

14. An apparatus according to claim 9, further comprising a difference output unit for examining a difference between two of said plurality of subsystems.

15. An apparatus according to claim 14, wherein said difference output unit includes a unit for examining a difference in two of said plurality of specifications.

16. An apparatus according to claim 9, wherein said at least one development device comprises first and second development devices, said first and second development devices performing a revision of different subsystems simultaneously.

17. A method of managing development of a software system including a plurality of subsystems, comprising steps of:
   storing information indicating a correspondence between each of said plurality of subsystems and at least one of a plurality of specifications in a subsystem information file;
   storing contents of said plurality of specifications in a specification information file;
   extracting first information regarding the subsystem to be revised from said subsystem information file and said specification information file;
   sending said first information to a development device;
   producing second information by revising said first information in said development device; and
   receiving said second information from said development device and updating said subsystem information file and said specification information file according to said second information.

18. An apparatus according to claim 1, further comprising a system information file storing information indicating a correspondence between a system and said plurality of subsystems.

19. An apparatus according to claim 9, further comprising a system information file storing information indicating a correspondence between a system and said plurality of subsystems.

20. A method according to claim 17, further comprising steps of:
   storing information indicating a correspondence between a system and said plurality of subsystems in a system information file;
   examining a difference between said first and second information; and
   updating said system information file when there is a difference between said first and second information.

21. A method according to claim 20, wherein said step of updating is performed only when said difference is greater than a predetermined level.

22. An apparatus according to claim 1, wherein said plurality of specifications describe functions of respective ones of said plurality of subsystems.

23. An apparatus according to claim 1, wherein said subsystem extractor includes a copying means for copying said first information regarding the subsystem to be revised from said subsystem information file and said specification information file.

24. An apparatus according to claim 1, wherein said updating unit performs said updating by adding said second information to said subsystem information file and said specification information file.

* * * * *